UNITED STATES PATENT OFFICE.

CARLETON ELLIS, OF WHITE PLAINS, NEW YORK, ASSIGNOR TO FERTILIZER PRODUCTS COMPANY, OF JERSEY CITY, NEW JERSEY, A CORPORATION OF NEW JERSEY.

INSECTICIDE AND PROCESS OF PREPARATION THEREOF.

No. 901,793.     Specification of Letters Patent.     Patented Oct. 20, 1908.

Application filed April 15, 1907. Serial No. 368,168.

*To all whom it may concern:*

Be it known that I, CARLETON ELLIS, a citizen of the United States, and a resident of White Plains, in the county of Westchester and State of New York, have invented certain new and useful Improvements in Insecticides and the Processes of Preparation Thereof, of which the following is a specification.

This invention relates to compositions for poisoning or destroying insects, especially those infesting vegetation, and comprises poison-coated particles and their method of preparation as hereinafter set forth.

The majority of the biting or gnawing insects which depredate gardens are susceptible to the poisonous action of arsenicals. As little as a millionth of a grain of an ordinary arsenical is believed to be sufficient to destroy the individual insect in most cases, while a ten thousandth of a grain is a deadly quantity for the majority of injurious larvæ, many beetles and the locusts.

Insects which do not actually masticate and swallow some portion of the solid substance of the plant, but which injure plants by the gradual extraction of the juices, either from the bark, leaves or fruit are destroyed with more difficulty by arsenicals. Insects of the latter class possess, instead of biting jaws, sucking beaks or bristles, which are thrust down through the outer layers of the bark or leaves into the soft succulent tissues beneath and used to extract the plant juices. Such insects which comprise plant lice, scale insects, thrips and plant feeding mites, are best destroyed by the use of substances which will act externally on their bodies, either as a caustic or to smother or stifle them by closing their breathing pores.

In the use of arsenicals it has been found necessary, in most cases, for the sake of economy and in the attempt to secure better distribution to mix the paris green, arsenite of lime, or whatever arsenical is employed with a quantity of an inert material such as flour or lime or gypsum, etc. Usually ten to twenty-five parts of this inert material or diluent is used to one part of arsenical. For vegetables which are ultimately to be used as food, as the cabbage, one is generally recommended to mix one ounce of the poison with from six to ten pounds of diluent, thus making the proportion one part poison to ninety-six up to one hundred and sixty of diluent.

If arsenicals were capable of mechanical reduction to extremely small particles, such use of diluents would not greatly lessen the relative effectiveness of the poison, but inasmuch as the needful minute subdivisions by grinding, etc., is practically impossible, the expense attendant on their use is comparatively great. Paris green for instance, is usually a rather coarse powder, or, more properly speaking, crystal, and when diluted with ten parts or more of an inert material is singularly ineffective, relatively speaking, because of poor distribution. A mixture of this character when dusted on plants may not furnish more than one or two particles of the poison per leaf although the foliage may seemingly be well dusted or coated with the mixture of poison and inert material. Sometimes no trace of the poison can be found on such a dusted leaf even when great pains have been taken to secure a thorough mixture of the poison with its diluent. Again the handling of such preparations or the jarring occurring during transportation often results in a partial separation of poison and inert material to the detriment of the composition as a whole. Other arsenicals have much the same action as paris green in this respect, it being impossible to reduce or grind to sufficient fineness to secure the full efficiency of such compounds.

It is the object of my invention to combine arsenicals with a carrier in such a manner that their full toxic action may be economically exerted and stratification in the container largely or wholly prevented.

My improved method to accomplish this end consists in the precipitation or deposition of the arsenical or poison upon the carrier so that each individual particle of said carrier is coated with a minute layer of poison thus making every particle of the composition effective, especially when arsenicals are employed as the most minute quantities of these when eaten by the insect cause death.

In order to produce a composition of this novel and desirable character, I prefer to proceed by first dissolving white arsenic in a solution of carbonate of soda or in other ways providing a soluble arsenical, in mixing this solution with a carrier such as gypsum or wood flour and then adding, preferably with agitation, a quantity of a precipitating salt or compound, such as copper sulfate or milk of lime sufficient in amount to completely precipitate the soluble arsenical upon the fibers or particles of the carrier.

As a suitable poison, I prefer, as stated, to use the arsenicals such as those of copper, lime, lead, manganese, zinc, magnesium, etc.

Probably the cheapest stock solution for the preparation of my composition is that formed by boiling together in about one gallon of water a pound of white arsenic and four pounds of sal soda crystals until the arsenic is dissolved.

As carriers I may employ organic bodies such as wood, flour, ground charcoal, peat, flour meal or bran, Peruvian bark refuse, comminuted extracted wood of other sorts as ground tan bark, or porous inorganic bodies as infusorial earth, tripolite, scoria, flowers of sulfur or non porous bodies as gypsum, zinc oxid, barytes, marble dust, ground quartz, or other stone as talc, etc.

Suitable precipitating agents are milk of lime or soluble lime salts, soluble copper salts, as copper sulfate or chlorid, lead nitrate, etc.

The carrier is preferably so proportioned with respect to the other components as to give a product containing two to eight percent. of arsenic oxid. If much in excess of eight percent. the product is sometimes harmful to vegetation. Much less than two percent. is not desirable but a material reduction below this percentage is preferred in treating certain vegetables such as cauliflower, cabbage, Brussels sprouts and the like. The effectiveness of the arsenical in this extended form is very great and a content of oxid of arsenic of about two per cent. affords results which are fairly comparable with insecticides composed merely of mechanical mixtures of the divers ingredients and running far higher in arsenic. Inasmuch as the arsenical is necessarily the costly element in these compositions it will be evident that a very great economy is attendant in the use of my improved composition.

Waste sludges as sulfate of lime from the manufacture of carbonic acid gas or carbonate of lime from alkali or paper works or from water purification and the like form a cheap carrier.

An illustrative formula in accordance with my invention is made by mixing one gallon of the alkali arsenite solution previously mentioned with seventy pounds of sulfate of lime sludge (containing approximately 60% water) and subsequently adding, with agitation, a sufficient quantity of a saturated solution of copper sulfate to effect complete precipitation of the arsenic. A faint excess of copper salt, shown by the ferro-cyanid test, indicates satisfactory precipitation. Thus prepared, each tiny particle of the sulfate of lime is coated with a minute layer of copper arsenite in a peculiarly effective form. The product may be washed, if desired, to remove sodium sulfate, filter pressed, dried and put through a fine sieve.

Many of the sucking insects are destroyed with the composition illustrated by the following formula. Peruvian bark refuse by weight twenty-five pounds is beaten together with thick milk of lime containing the equivalent of ten pounds of calcium oxid. Soda arsenite is then added with rapid agitation to the extent of one gallon of the stock solution above referred to. By the action of the lime the arsenic is precipitated on the particles of the bark refuse and forms a coating of arsenite of lime. The preparation may be dried and packed in suitable containers. The drying may be done by mere air drying or by artificial heat or by chemical desiccation as by the addition of ground or crushed quicklime.

Another illustrative formula comprises one hundred and forty pounds of carbonate of lime sludge, containing about 60% moisture more or less, three gallons arsenite of soda stock solution with sulfate of copper and milk of lime to act as precipitating agents. The arsenite of soda is first mixed with the lime sludge, then a concentrated solution of copper sulfate is added until the copper is in slight excess; finally milk of lime is run in to precipitate the excess of copper.

Foliage which is very sensitive may be treated with a lead arsenical as illustrated by the following formula. Fifty pounds of barytes, ten pounds of ground soapstone and ten pounds of ground short-fibered asbestos are mixed with five gallons stock arsenite soda solution and acetate of lead solution added to precipitate the arsenic.

All those compositions made in this manner which contain soluble salts may be washed to remove such salts prior to drying provided, of course, the soluble salts present are detrimental. In drying the product lumps sometimes form which may be broken up and the mass screened to give a uniform appearance and action.

While it will be evident that my arsenical coated carrier may be diluted with uncoated inert material or mixed with ordinary arsenicals, such a course is undesirable except in a few special cases.

The compositions made in accordance with my invention may be applied in the dry state by means of a powder bellows and the like, or five to ten pounds of the powder or paste may be added to one hundred gallons of water and applied as a spray or wash.

Occasionally it is advisable to apply my composition as a poisoned bait, especially in the case of attacks of the grasshopper and of the several cutworms and wireworms. In such cases I prefer to use bran as the carrier for the arsenical or other poison and at the time of application the composition is made into a wet mash with molasses and water and a teaspoonful or more of this preparation is placed at the base of the tree or plants.

Sometimes it is desirable, especially with certain forms of beetles, to precipitate an arsenical upon particles of hellebore, thus intimately combining the two poisons in an effective way; similarly with other insecticidal compounds.

The powders produced in accordance with my invention need not be thoroughly dried if intended to be used for spraying as if retained in a slightly moist condition, or pasty form, satisfactory results are obtained. For spraying purposes it is often desirable to have an insecticide of about the specific gravity of water in order that settling out may not too quickly occur. My invention makes this possible as by selecting a material lighter than water as Peruvian bark refuse or wood flour and precipitating thereon a suitable quantity of an arsenical such as lead arsenite a product is secured which does not settle out of water for a long period of time and is of exceptional value in spraying operations. Other materials besides insecticidal compounds may of course be precipitated upon the carrier. For instance, barium chlorid and sodium sulfate may be used to form barium sulfate on the carrier particles to modify their gravity. Likewise the carrier itself may be formed by precipitation, and the formation of the insoluble arsenite under certain circumstances. However, such procedure does not yield particles with the poison wholly on the exterior and therefore the product therefrom is not entirely satisfactory.

To recapitulate, my invention is for an improved composition of matter, as an insecticide, comprising a preferably dry pulverulent powder or mass of particles or grains of organic or mineral matter or both, such matter being preferably practically insoluble in water, and the grains or particles of which are more or less coated or contacted or enveloped by a modicum of an insect poison, preferably an insoluble arsenical as copper arsenite; and the process of making said insecticide which consists in precipitating on a finely divided or comminuted carrier a suitable quantity of said insect poison, whereby the said modicum of poison is distributed uniformly over a comparatively enormous surface.

The term poison as herein employed is intended to embrace those substances which have a toxic action on insects in the manner well understood in the art to which this invention appertains and in that same sense is so used in the subjoined claims.

Having described my invention in the foregoing specification, to the details of which it is of course not to be limited, what I claim is:—

1. As an insecticide, a dry, pulverulent mass having each of its particles coated with a non-volatile, insoluble poison, said base particles comprising a material of a chemically different character from the coating thereof.

2. As an insecticide, a dry impalpable powder, each particle of which is coated with a non-volatile insoluble insect poison, said base particles comprising a material of a chemically different character from the coating thereof.

3. As an insecticide, a dry powder having each of its particles coated with an insoluble inorganic insect poison, said base particles comprising a material of a chemically different character from the coating thereof.

4. As an insecticide, a dry impalpable powder having each of its particles coated with an insoluble arsenical compound, said base particles comprising a material of a chemically different character from the coating thereof.

5. As an insecticide, a dry powder having each of its particles coated with precipitated copper arsenite, said base particles comprising a material of a chemically different character from the coating thereof.

6. As an insecticide, an impalpable inorganic powder consisting of poison-coated particles, said base particles comprising a material of a chemically different character from the coating thereof.

7. As an insecticide, an impalpable inorganic powder consisting of arsenical-coated particles, said base particles comprising a material of a chemically different character from the coating thereof.

8. As an insecticide, a powder consisting of particles lightly coated with copper arsenite, said base particles comprising a material of a chemically different character from the coating thereof.

9. As an insecticide a powder consisting of inert impalpable insoluble inorganic particles coated with an insoluble poison, said base particles comprising a material of a chemically different character from the coating thereof.

10. As an insecticide, a powder consisting of inert impalpable particles of mineral matter lightly coated with an inorganic insect poison, said base particles comprising a material of a chemically different character from the coating thereof.

11. As an insecticide, a powder consisting of inert dry impalpable particles of mineral matter coated with a substantially insoluble arsenical compound, said base particles comprising a material of a chemically different character from the coating thereof.

12. As an insecticide, a powder consisting of impalpable granular particles of mineral matter lightly coated with an insoluble arsenical compound, said base particles comprising a material of a chemically different character from the coating thereof.

13. As an insecticide, an impalpable powder consisting of granular particles of inert mineral matter lightly coated with precipitated copper arsenite, said base particles comprising a material of a chemically different character from the coating thereof.

14. As an insecticide, an impalpable powder consisting of granular particles of inert mineral matter having an insoluble arsenical precipitate thereon, said base particles comprising a material of a chemically different character from the coating thereof.

15. An insecticide, consisting of impalpable granular particles of mineral matter enveloped by an insoluble non-volatile insect poison, said base particles comprising a material of a chemically different character from the coating thereof.

16. An insecticide consisting of granular particles of mineral matter having an insoluble poison precipitate on the major portion of said granular particles, said base particles comprising a material of a chemically different character from the coating thereof.

17. An insecticide consisting of an inert insoluble pulverulent calcium salt having its particles coated with an insoluble arsenical compound.

18. An insecticide consisting of an inert insoluble pulverulent calcium salt having its particles coated with copper arsenite.

19. An insecticide consisting of powdered calcium sulfate lightly coated with an arsenical compound.

20. An insecticide consisting of powdered calcium sulfate, the separate particles of which are coated with an arsenical compound.

21. An insecticide comprising an inert insoluble pulverulent mass each of the particles of which is coated with an insoluble arsenical compound, said insecticide containing not in excess of eight percent. of combined oxid of arsenic.

22. An insecticide consisting of an inert insoluble pulverulent mass, coated with an insoluble arsenical, said insecticide containing approximately two per cent. of combined oxid of arsenic.

23. An insecticide consisting of an inert insoluble precipitate lightly coated with an arsenical precipitate.

24. Process of making an insecticide which consists in precipitating upon an inorganic finely divided carrier, a suitable quantity of an insoluble inorganic insect poison.

25. Process of making an insecticide which consists in precipitating upon a finely divided carrier, a suitable quantity of a substantially insoluble arsenical compound.

26. Process of making an insecticide which consists in precipitating upon the particles of a calcium-salt sludge a modicum of an arsenical compound.

27. Process of making an insecticide which consists in precipitating upon the particles of a calcium-sulfate sludge a modicum of an arsenical compound.

28. Process of making an insecticide which consists in precipitating upon the particles of a calcium-sulfate sludge a modicum of copper arsenite.

29. Process of making an insecticide which consists in treating a calcium-sulfate sludge containing a dissolved arsenical with a quantity of a solution of a copper salt to completely precipitate said dissolved arsenical upon the insoluble particles of said sludge.

Signed at New York in the county of New York and State of New York this eleventh day of April A. D. 1907.

CARLETON ELLIS.

Witnesses:
FLETCHER P. SCOFIELD,
BRIDELLA M. ELLIS.